United States Patent
Sherwood

(10) Patent No.: US 7,537,219 B1
(45) Date of Patent: May 26, 2009

(54) TRAILER WHEEL SYSTEM

(76) Inventor: Dennis Sherwood, 1520 SE. 8th St., Deerfield Beach, FL (US) 33441

(*) Notice: Subject to any disclaimer, the term of this patent is extended or adjusted under 35 U.S.C. 154(b) by 459 days.

(21) Appl. No.: 11/314,140

(22) Filed: Dec. 21, 2005

Related U.S. Application Data

(60) Provisional application No. 60/735,959, filed on Nov. 10, 2005.

(51) Int. Cl.
*B60G 11/27* (2006.01)
*B60G 3/14* (2006.01)
*B60G 17/04* (2006.01)

(52) U.S. Cl. ............. 280/6.151; 280/124.116; 280/124.128; 280/124.157

(58) Field of Classification Search ........ 280/6.151, 280/6.15, 124.116, 124.128, 124.157, 124.16, 280/43.17, 43.18, 43.23
See application file for complete search history.

(56) References Cited

U.S. PATENT DOCUMENTS

| | | | |
|---|---|---|---|
| 3,342,141 A | | 9/1967 | Browne |
| 3,784,218 A | * | 1/1974 | Stone ................ 280/43.23 |
| 3,831,210 A | * | 8/1974 | Ow .................... 280/414.5 |
| 3,832,932 A | | 9/1974 | Even et al. |
| 4,003,583 A | | 1/1977 | Stanzel |
| 4,202,277 A | | 5/1980 | Browne et al. |
| 4,314,709 A | | 2/1982 | Silbernagel |
| 4,342,264 A | | 8/1982 | Hindin et al. |
| 4,619,578 A | | 10/1986 | Routledge |
| 4,792,148 A | | 12/1988 | Hintz |
| 4,878,691 A | * | 11/1989 | Cooper et al. ............ 280/189 |
| 4,900,055 A | | 2/1990 | Wright |
| 4,917,020 A | | 4/1990 | Wicks et al. |
| 4,934,733 A | * | 6/1990 | Smith et al. .......... 280/124.132 |
| 5,016,912 A | | 5/1991 | Smith et al. |
| 5,058,916 A | | 10/1991 | Hicks |
| 5,220,870 A | | 6/1993 | Larson |
| 5,275,430 A | * | 1/1994 | Smith .................. 280/6.151 |
| 5,433,578 A | | 7/1995 | Honan |
| 5,823,558 A | | 10/1998 | Shoquist |
| 5,863,049 A | * | 1/1999 | Mahvi ................. 280/6.152 |
| 5,887,880 A | * | 3/1999 | Mullican et al. ........ 280/43.18 |
| 5,951,233 A | * | 9/1999 | Boucher et al. ............ 414/495 |
| RE37,492 E | * | 1/2002 | Shoquist ................ 280/81.6 |
| 6,986,519 B2 | * | 1/2006 | Smith ................ 280/124.128 |
| 2005/0253352 A1 | * | 11/2005 | Ziech ................. 280/124.128 |
| 2006/0012145 A1 | * | 1/2006 | Gardner ............... 280/124.128 |
| 2006/0214408 A1 | * | 9/2006 | Davey ...................... 280/771 |

* cited by examiner

*Primary Examiner*—John Q. Nguyen
*Assistant Examiner*—George D. Spisich

(57) ABSTRACT

An improved trailer wheel system including a trailer mounting support, a fender mounting support, a main suspension support arm and an air bag. The trailer mounting support is mounted to a trailer platform. The fender mounting support is attached to the trailer mounting support. One end of the main suspension support arm is mounted to one end of the trailer mounting support. The air bag is attached to the other end of the main suspension support arm and the fender mounting support. A wheel axle is mounted to the main suspension support arm and a wheel is mounted to the wheel axle. The air bag is used to raise or lower the trailer for more efficient loading and unloading, as well as acting as an anti-theft device, and providing a smoother ride for the equipment being transported and the towing vehicle.

4 Claims, 4 Drawing Sheets

TRAILER WHEEL SYSTEM

CROSS-REFERENCE TO RELATED APPLICATION

This application claims the benefit of co-pending U.S. Provisional Patent Application Ser. No. 60/735,959 filed Nov. 10, 2005, which is incorporated by reference herein in its entirety.

BACKGROUND OF THE INVENTION

1. Field of the Invention

The present invention relates generally to an improved trailer wheel system, particularly a system that utilizes air bags to facilitate the trailer being raised or lowered from the ground level for more efficient loading and unloading, as well as acting as an anti-theft device, and providing a smoother ride for the equipment being transported and the towing vehicle.

2. Description of the Prior Art

The benefits associated with trailers as transportation mediums are well known. Historically, in the early days of settlement, the original mode for moving chattel was the horse, which pulled a two-wheeled cart full of goods. This evolved into two horses pulling an extra load of goods, but still with two wheels on the cart. Following this improvement, two horses were used to pull a four-wheeled wagon. The improvement of four wheels over two wheels was significant, as the load being transported was spread far more evenly, and greater carrying capacity was possible.

These primitive transportation means paved the way for modern day trailers, which are far more stable than their historic counterparts, and are able to carry much larger loads. Trailers are now commonly used in a variety of ways, including the transportation of equipment and livestock, and even as mobile dwellings.

Existing trailers, however, are not without their disadvantages. The most significant of these is the inability to be raised and lowered from the ground. Ninety five percent of light trailers are equipped with an axle rigidly attached to a bottom of the trailer, thus preventing the upward and downward mobility of the trailer. This presents problems when trying to load equipment onto the trailer, as it requires ramps and other means that can be a hindrance to the transportation process. Another disadvantage in existing trailers is that by their very nature (wheeled storage compartments) they are more susceptible to theft, as they can be unhitched and/or switched to a vehicle and driven off to another location, without the owner's awareness or consent.

Yet another disadvantage of current trailers is that they lack any type of air ride system to make the ride smoother, thus increasing the chances of equipment being jostled about and/or damaged, as well as added wear and tear on the towing vehicle. Finally, many neighborhoods allow aesthetically pleasing storage sheds on the homeowners' properties, but do not permit trailers to be parked in residential areas, because they are considered unsightly.

Accordingly, there is an established need for an improved trailer wheel system that, in addition to providing a smoother and more stable ride during the transport process, also increases the efficiency of loading and unloading by allowing the trailer to be raised and lowered, while at the same time deterring theft. Further, the improved trailer wheel system can be retro-fitted onto existing light trailers or built into new ones, as well as providing a more aesthetically pleasing storage shed configuration that can be painted to satisfy residential area requirements.

SUMMARY OF THE INVENTION

The present invention is directed to an improved trailer wheel system. The trailer wheel system of the present invention is configured for providing an air ride suspension that utilizes a single air source mounted directly on the trailer.

An object of the present invention is to provide an improved trailer wheel system that utilizes an air ride suspension for raising and lowering a trailer from the ground during loading and unloading.

A further object of the present invention is to provide an improved trailer wheel system that effectively protects the equipment being transported from theft by utilizing the air ride suspension to ground the trailer, preventing the wheels from functioning, and the trailer from being pulled away.

Another object of the present invention is to provide an improved trailer wheel system that utilizes an air ride suspension to provide a more even ride, decreasing the chances of damage to the equipment, as well as the strain placed on the transporting vehicle.

In accordance with a first aspect of the invention, an improved trailer wheel system is provided comprising an air ride suspension utilizing an airbag that can be inflated or deflated depending on the desired configuration of the trailer (raised or lowered).

In accordance with a second aspect of the invention, an air line with a dump valve is provided as a means of supplying air to the airbag and controlling the raising and lowering of the trailer.

In accordance with a third aspect of the invention, a compressor and supply tank are mounted onto the trailer to provide the necessary air required to engage the airbag and conform the trailer to the desired configuration.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Shown throughout the figures, the present invention is generally directed towards a soft-ride suspension, utilized for enabling a trailer to be raised and lowered to facilitate loading and unloading of equipment, while acting as a theft deterrent, and providing a smoother ride during the transportation process.

Figure 1:
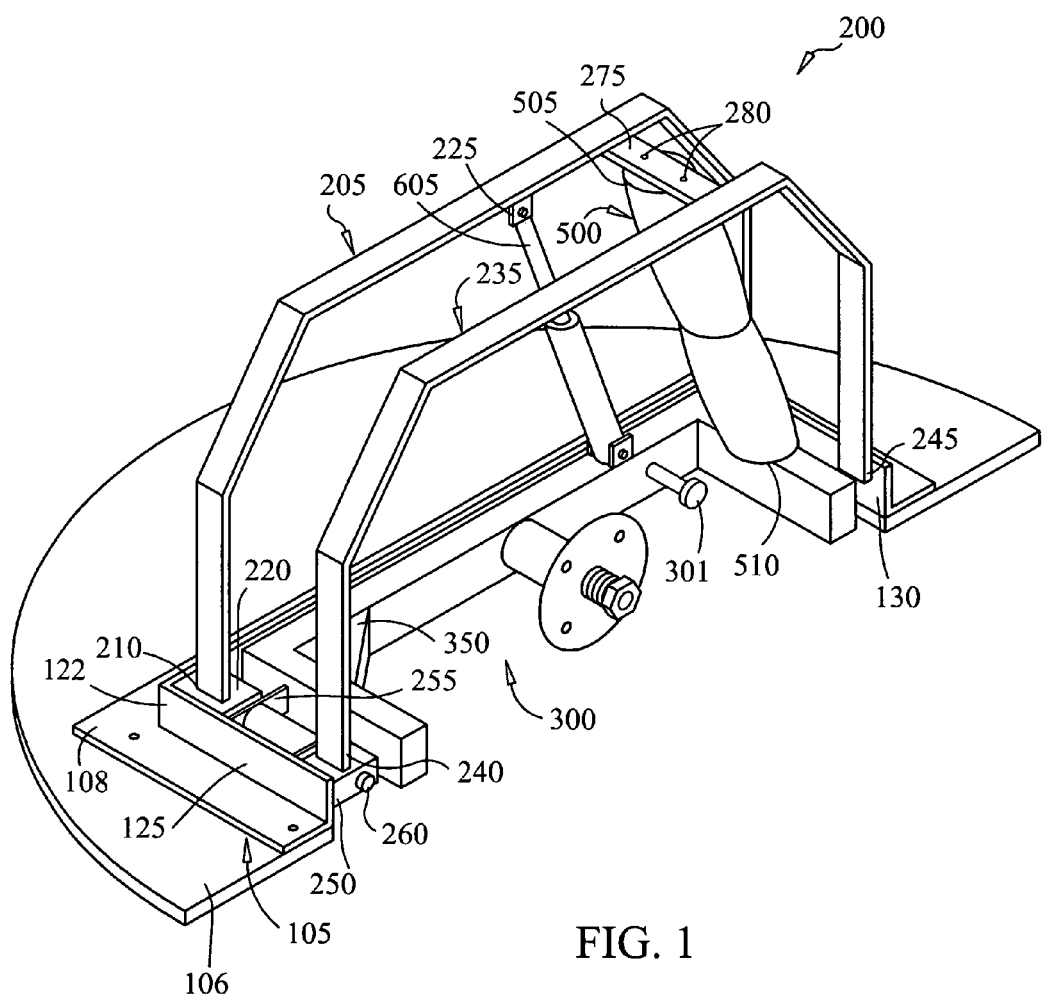
FIG. 1 is a perspective view of the improved trailer wheel system showing a mounting suspension support arm in a normal position, ready for transport.
Figure 2:
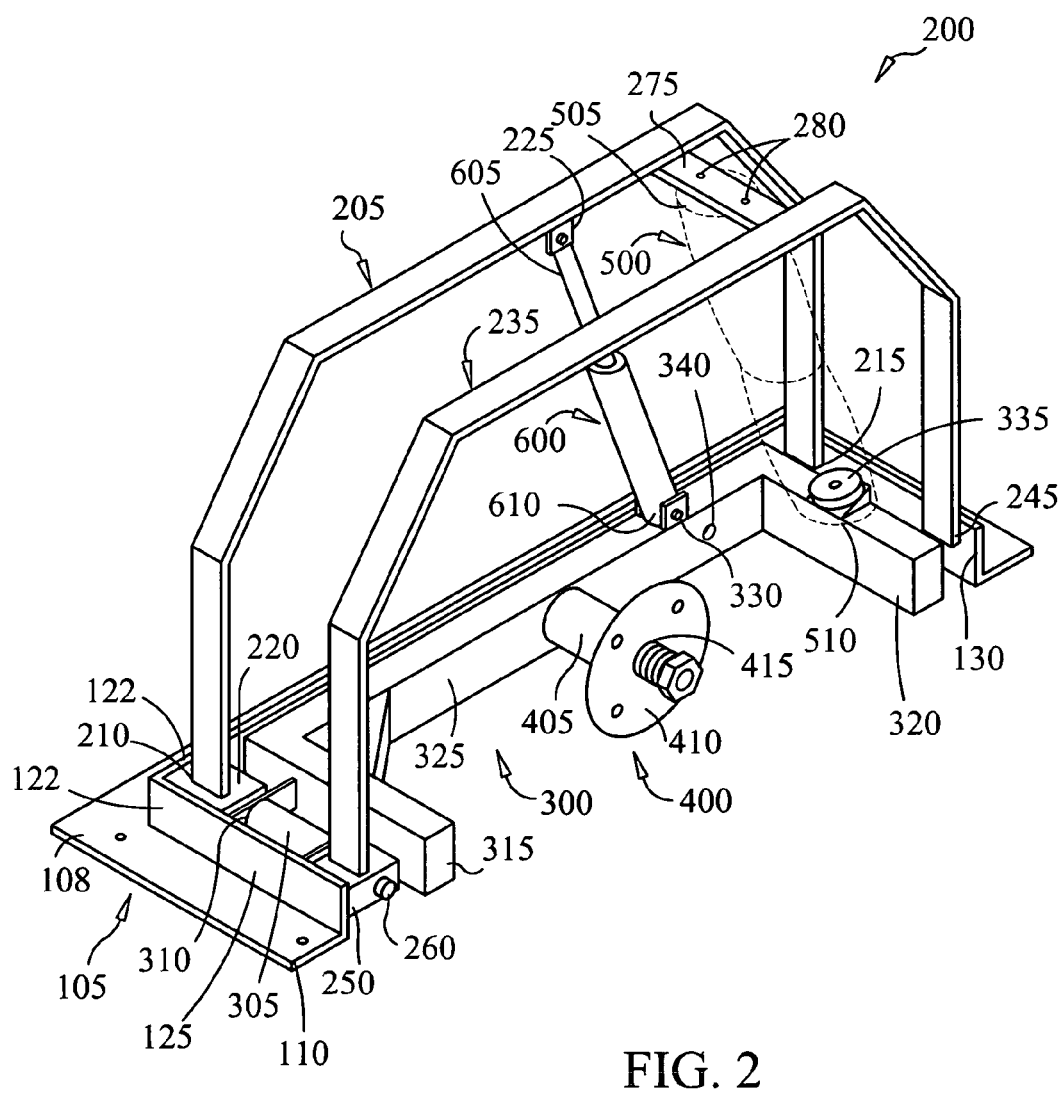
FIG. 2 is a perspective view of the improved trailer wheel system showing the mounting suspension support arm in a normal position, ready for transport, with an airbag shown in phantom to reveal the airbag mounting plate.
Figure 3:
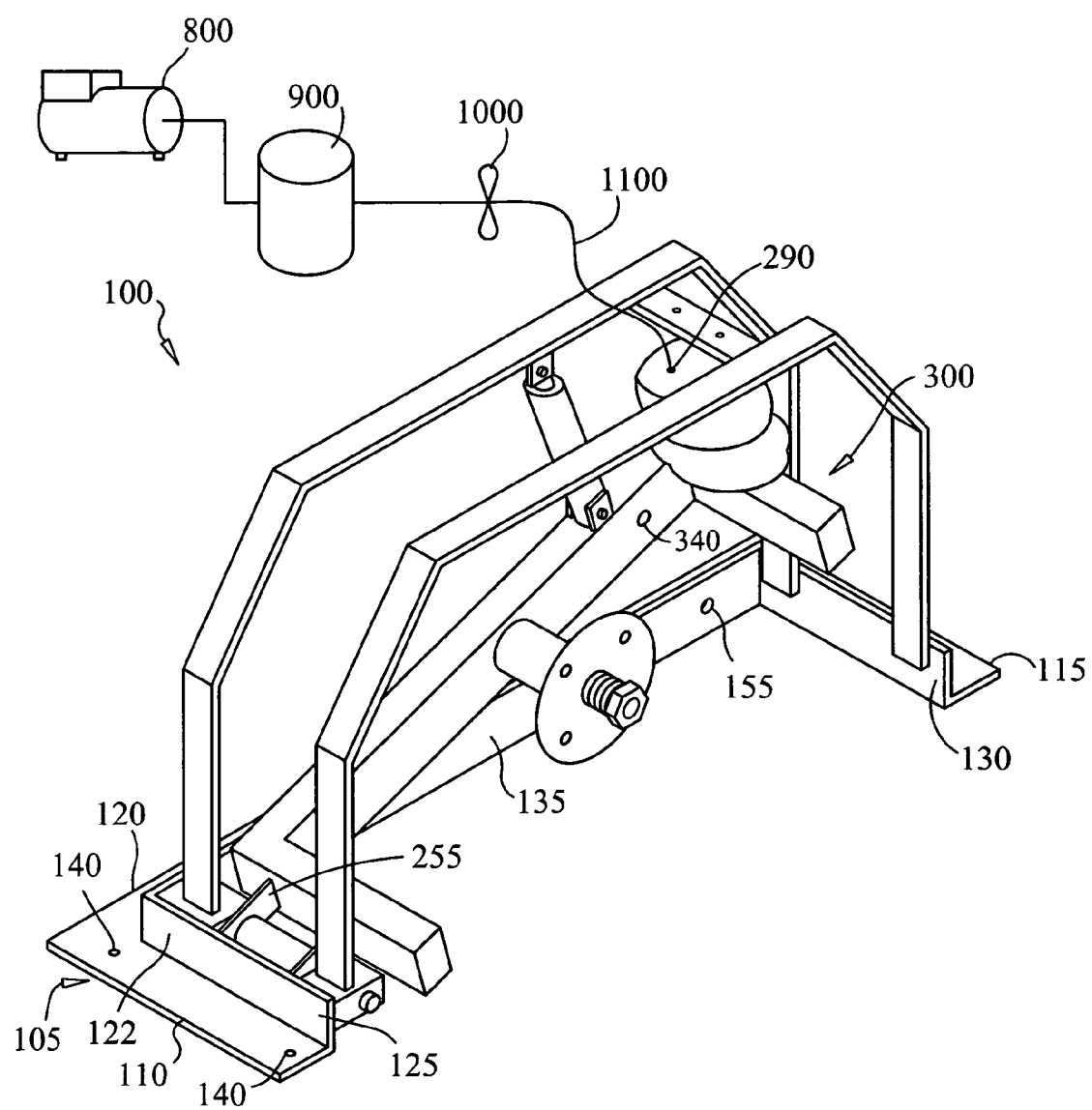
FIG. 3 is a perspective view of the improved trailer wheel system showing the mounting suspension support arm in a retracted position to allow a trailer to be loaded or unloaded without a ramp and showing a schematic diagram of a compressor, supply tank, dump valve, and air line.

Referring now to FIGS. 1-2, a main suspension support arm 300 of an improved trailer wheel system 100 is shown in a normal position, conducive to transporting a trailer from one location to another. Referring to FIG. 3, the main suspension support arm 300 is shown in a retracted position for loading, unloading and storage. It will be appreciated by those skilled in the art that the structural elements of the present invention may be formed from any of a wide variety of known materials without departing from the present invention. In the preferred embodiment, the structural components of the improved trailer wheel system 100 will be formed out of aluminum, steel, or any other similar lightweight, metallic alloy.

The improved trailer wheel system 100 includes a trailer mounting support 105 for mounting to a trailer platform 106. The trailer mounting support 105 includes a base 108 and a vertical wall 122 extending upward from the base 108. The base 108 includes a base front end 110, a base back end 115, and a base side end 120. The base front end 110 extends from one end of the base side end 120 and the base back end 115 extends from the other end of the base side end 120. A plurality of orifices 140 are formed through the base 108 to receive a plurality of fasteners for mounting to the trailer platform 106. The vertical wall 122 includes a vertical wall front end 125 extending from one end of a vertical wall side end 135 and a vertical wall back end 130 extending from the other end of the vertical wall side end 135.

A fender mounting support 200 is mounted to an inner surface of the vertical wall 122. The fender mounting support 200 includes a first fender strut 205 and a second fender strut 235. The first fender strut 205 includes a first fender strut front end 210, which is attached to a first fender strut base 220. The first fender strut base 220 is attached to an inner surface of the vertical wall front end 125. A first fender strut back end 215 of the first fender strut 205 is attached to an inside surface of the vertical wall back end 130. At least one top shock absorber mounting plate 225 is attached to the first fender strut 205. One end 605 of a shock absorber 600 is pivotally attached to the top shock absorber mounting plate 225.

The second fender strut 235 includes a second fender strut front end 240, which is attached to a second fender strut base 250. The second fender strut base 250 is attached to an inner surface of the vertical wall front end 125. A second fender strut back end 245 of the second fender strut 235 is attached to an inner surface of the vertical wall back end 130.

The third major component of the improved trailer wheel system 100 is a main suspension support arm 300, which is pivotally retained by the fender mounting support 200 and radially retained by an air bag 500 and a shock absorber 600. The main suspension support arm 300 includes a front support arm portion 315, a back support arm portion 320 and a middle support arm portion 325. The front support arm portion 315 is attached to one end of the middle support arm portion 325 and the back support arm portion 320 is attached to the other end of the middle support arm portion 325. A gusset 350 is preferably attached between the front support arm portion 315 and the middle support arm portion 32 to increase strength of the main suspension support arm 300. A pair of arm pivot plates 255 extends from the front support arm portion 315. A spacer 305 is preferably located between the pair of pivot arm plates 255. A pivot pin 260 is inserted through the second fender strut base 260, the pair of pivot plates 255, the spacer 305 and the first fender strut base 220 to pivotally retain the main suspension support arm 300 relative to the trailer mounting support 105.

A wheel axle 400 preferably includes an axle portion 405, a wheel hub 410 and an axle nut 415. The axle portion 405 is attached to substantially a middle of the middle support arm portion 325. The wheel hub 410 is rotatably retained by the axle portion 405 and axially retained by the axle nut 415. At least one bottom shock absorber mounting plate 330 is attached to a top of the middle support arm portion 325. The other end 610 of the hydraulic shock absorber 600 is pivotally attached to the at least one bottom shock absorber mounting plate 330. A bottom airbag mounting plate 335 is attached to a top of the back support arm portion 320. A top airbag mounting plate 275 is attached to the first and second fender struts. One end 505 of an airbag 500 is attached to the top airbag mounting plate 275 utilizing at least one bolt hole 280. The other end 510 of the airbag 500 is retained by the bottom air bag mounting plate 335.

The airbag 500 is fully visible in an extended position. When the airbag 500 is filled with air, the airbag 500 causes the main suspension support arm 300 to be parallel with the trailer mounting support 105. As a result, the fender mounting support 200 is raised, exposing the wheels 700 and allowing the trailer to be attached to a towing vehicle for transportation.

In FIG. 3, the main suspension support arm 300 is shown in a retracted position, conducive to preventing theft and allowing loading and unloading of equipment from a trailer. In the event that the airbag 500 should become damaged or disabled, an airbag safety pin 301 can be placed through a mount airbag safety orifice 155 and a main airbag safety orifice 340 in order to retain the extended position, thus allowing continued mobility.

When the airbag 500 is deflated, the main suspension support arm 300 raises and the shock absorber 600 retracts. A bottom of the wheel 700 becomes flush with a bottom of the trailer platform 106, thus preventing the trailer from being transported or stolen.

Also visible in these illustrations is an air line 1100 attached to the airbag 500 via an air line orifice 290. Air is regulated by a dump valve 1000 (which allows the air to exit quickly or alternatively slowly dump back) when the air is received from a supply tank 900, after being received from a compressor 800.

Figure 4:
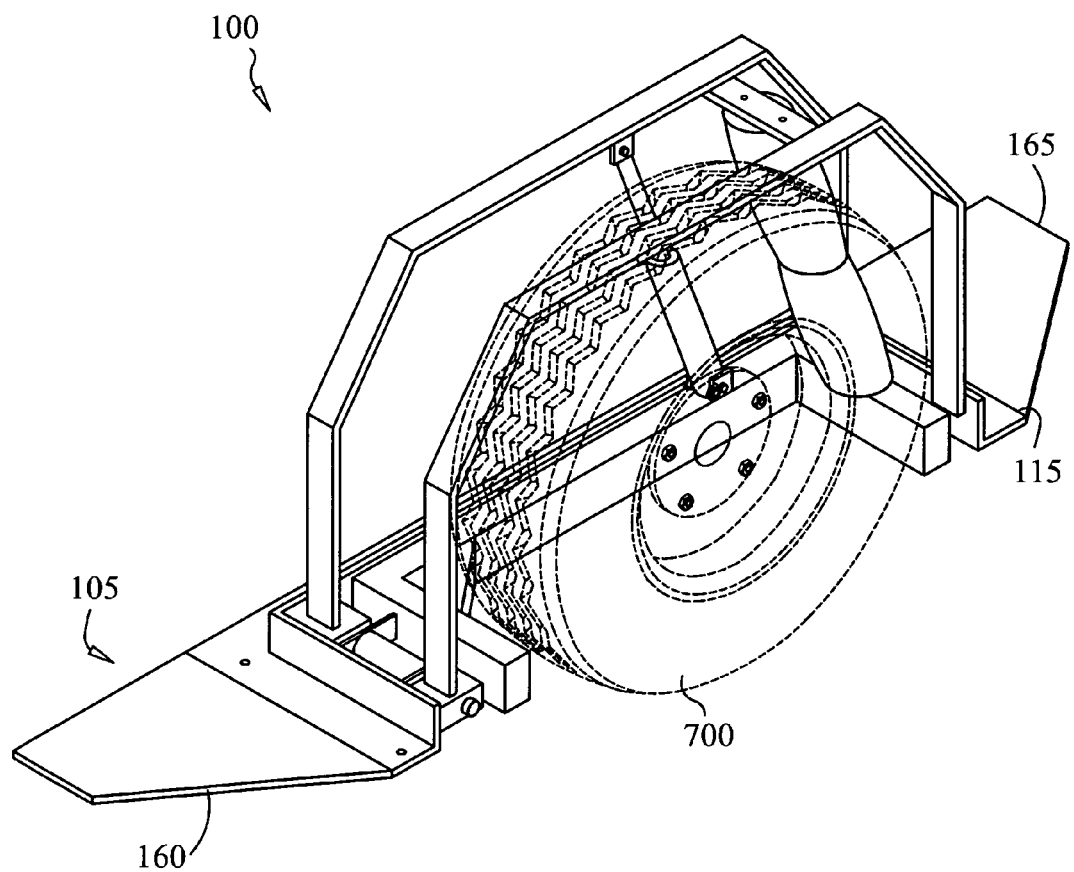
FIG. 4 is a perspective view of the improved trailer wheel system showing a wheel attached to a wheel hub and in a main suspension support arm in a normal position.

Referring now to FIG. 4, the wheel 700 is shown secured to the wheel hub 410. Attached to the base front end 110 and the base back end 115, are the front support bracket 160 and back support bracket 165, respectively. These are used in the retrofitting process for other trailers.

It will be appreciated by those skilled in the art that only a single wheel 700 embodiment has been depicted in the illustrations. Alternatively, the improved trailer wheel system 100 can be constructed in both tandem and tri-wheel 700 configurations, still allowing the trailer to be lowered onto the ground in order to carry heavier equipment and machinery.

Since many modifications, variations, and changes in detail can be made to the described preferred embodiments of the invention, it is intended that all matters in the foregoing description and shown in the accompanying drawings be interpreted as illustrative and not in a limiting sense.

I claim:

1. A trailer wheel system comprising:
    a trailer mounting support being attached to a trailer platform;

a suspension support arm having one end pivotally engaged with said trailer mounting support;

a wheel hub being rotatably retained by said suspension support arm, a wheel being mountable to said wheel hub;

a first fender strut having one end attached to said trailer mounting support and the other end attached to the other end of said trailer mounting support;

a second fender strut having one end attached to said trailer mounting support and the other end attached to the other end of said trailer mounting support;

a mounting plate having one end attached to said first fender strut and the other end attached to said second fender strut;

said first and second fender struts each including a separate base positioned at the lowermost portion of each strut and a at least one pivot pin of said suspension support arm extending into at least one of said bases; and at least one suspension device being disposed between said mounting plate and the other end of said suspension support arm, said suspension arm retracting upward while retaining the wheel to make a bottom of said trailer platform substantially flush with a support surface.

2. The trailer wheel system of claim 1, further comprising: an airbag being said at least one suspension device.

3. The trailer wheel system of claim 2, further comprising: an air compressor for inflating said airbag.

4. The trailer wheel system of claim 1, further comprising: a shock absorber being said at least one suspension device.

* * * * *